Dec. 16, 1958　　F. A. HAGGERTY ET AL　　2,864,202
GLASS MOLDING MACHINE

Filed Sept. 24, 1953　　　　　　　　　　4 Sheets-Sheet 1

INVENTORS
F. A. HAGGERTY
J. K. McDUFFEE

BY
ATTORNEY

Dec. 16, 1958  F. A. HAGGERTY ET AL  2,864,202
GLASS MOLDING MACHINE
Filed Sept. 24, 1953  4 Sheets-Sheet 2
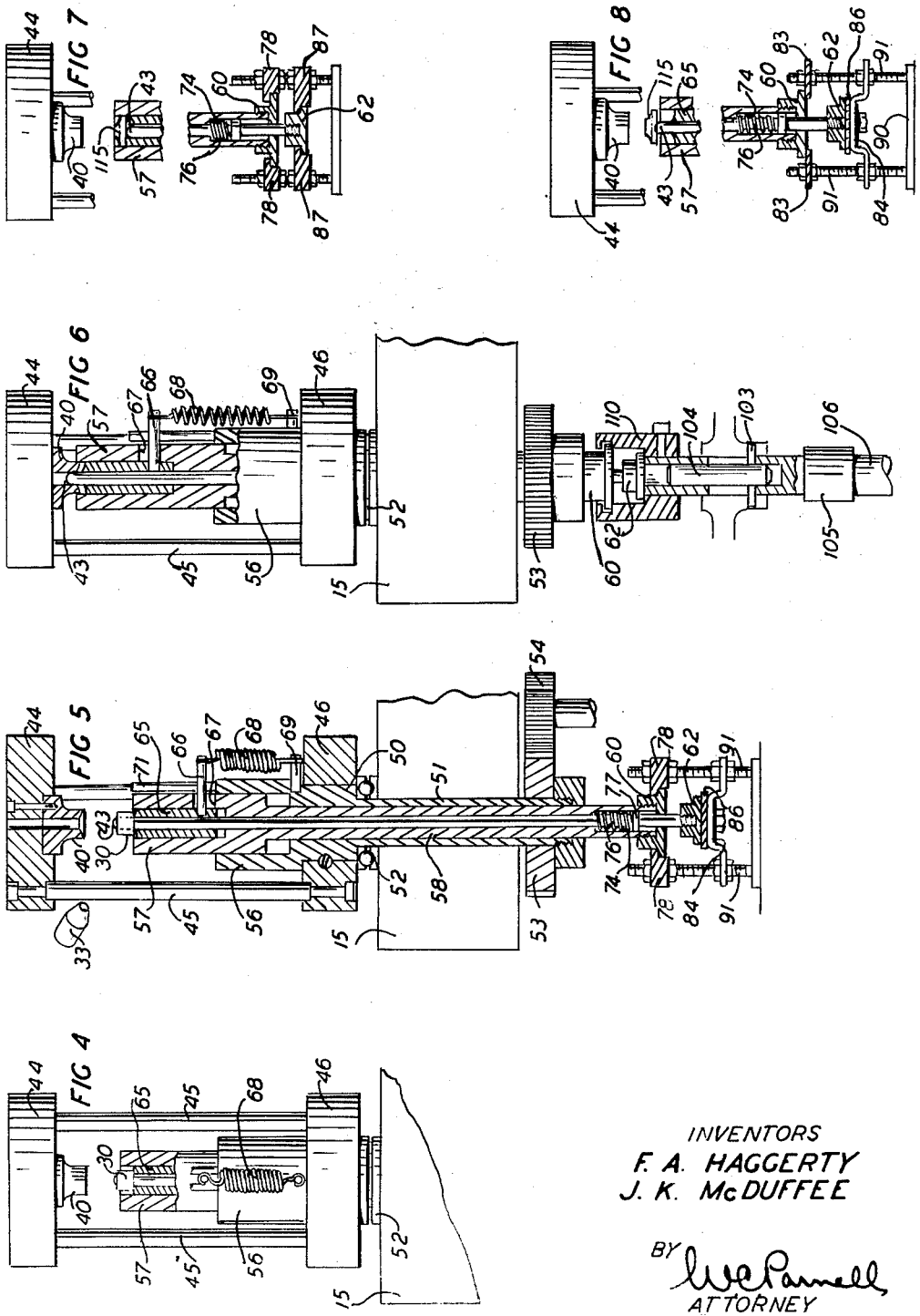
INVENTORS
F. A. HAGGERTY
J. K. McDUFFEE
BY W. C. Parnell
ATTORNEY Dec. 16, 1958  F. A. HAGGERTY ET AL  2,864,202
GLASS MOLDING MACHINE
Filed Sept. 24, 1953  4 Sheets-Sheet 3
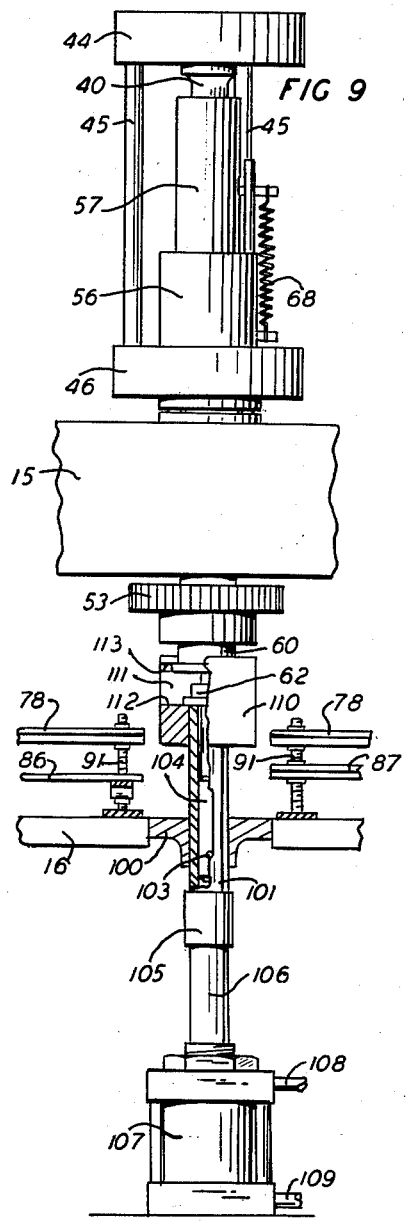
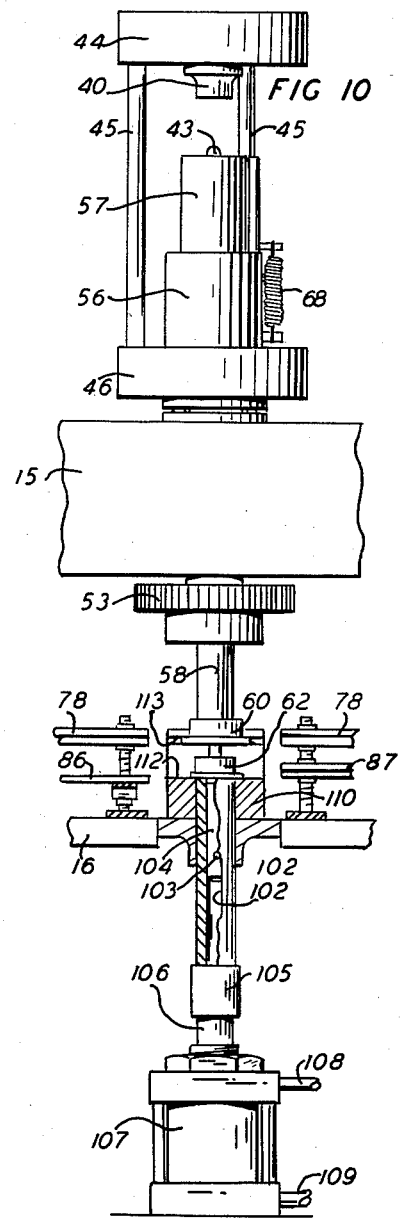
INVENTORS
F. A. HAGGERTY
J. K. McDUFFEE
BY
ATTORNEY

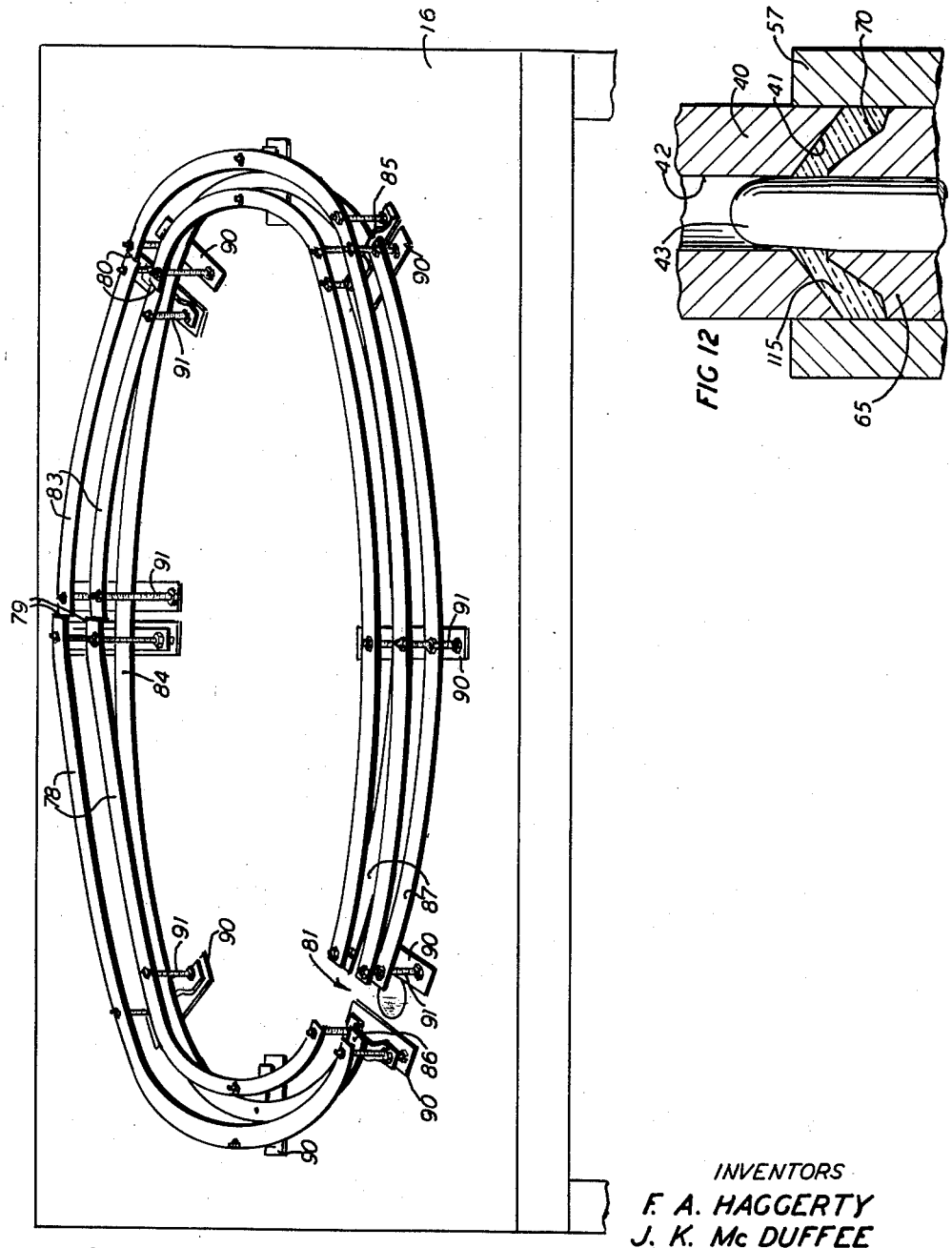

United States Patent Office 2,864,202
Patented Dec. 16, 1958

2,864,202
GLASS MOLDING MACHINE

Francis A. Haggerty, Coopersburg, and John K. McDuffee, Kutztown, Pa., assignors to Western Electric Company, Incorporated, New York, N. Y., a corporation of New York Application September 24, 1953, Serial No. 382,022

1 Claim. (Cl. 49—37)

This invention relates to apparatus for molding glass articles and more particularly to apparatus for molding annular articles from tubular glass blanks.

In forming glass articles in metal molds, the glass blank must be heated while the mold is open, and the cooling effect of the metal mold on the glass blank determines the initial temperature to which the glass blank must be heated so that it will be of the required plasticity during the molding operation. As an example, to mold the glass blank completely in one molding operation, using the particular type of glass desired, the temperature should be about 1000° C. Heating the glass to this temperature, however, makes it so tacky that it tends to adhere to metal. This makes it difficult to remove the article from the mold, particularly when it is formed around a mandrel.

The object of the invention is an apparatus for molding articles rapidly and efficiently from glass blanks.

With this and other objects in view, the invention comprises a molding apparatus having mold members mounted for relative movement into open and closed positions with a mandrel or core for the members movable relative thereto and means to close the mold quickly after heat has been applied to the blank to mold the article therefrom.

More specifically, the apparatus is of the turret type having a plurality of molding units spaced equally about the turret and movable intermittently to successive stations where the tubular blank is loaded in the mold at one station and passes through preheating stations to a press position. In this position the mold is rapidly closed momentarily to preform the blank, additional heat is applied to the preform and the mold reclosed to complete the molding operation without raising the glass to excessive temperatures. At the following stations, the mold is opened while heat is applied to the finished article during which time the mandrel or core may be stripped therefrom. The finished article is annealed at the next two stations and at the final station, the article, having been allowed sufficient time to cool and shrink, is ejected by the mandrel or core of the mold.

Other objects and advantages will be apparent from the following detailed description when considered in conjunction with the accompanying drawings, wherein:

Fig. 4 is a side elevational view of one of the molding units shown at the loading station;

Fig. 5 is a vertical sectional view of one of the molding units at one of the preheating stations;

Fig. 6 is a side elevational view of one of the molding units at the molding station, portions being shown in section;

Fig. 7 is a fragmentary vertical sectional view of portions of one of the units at one of the annealing stations;

Fig. 8 is a fragmentary vertical sectional view of one of the molding units at the ejecting station;

Fig. 9 is a side elevational view of one of the molding units shown closed at the molding station;

Fig. 10 is a side elevational view of the structure shown in Fig. 9 with the mold in its open position;

Fig. 11 is an isometric view of the track structure controlling the mold units at the various stations and Fig. 12 is an enlarged fragmentary vertical sectional view of one of the molds shown closed.

Figure 1:
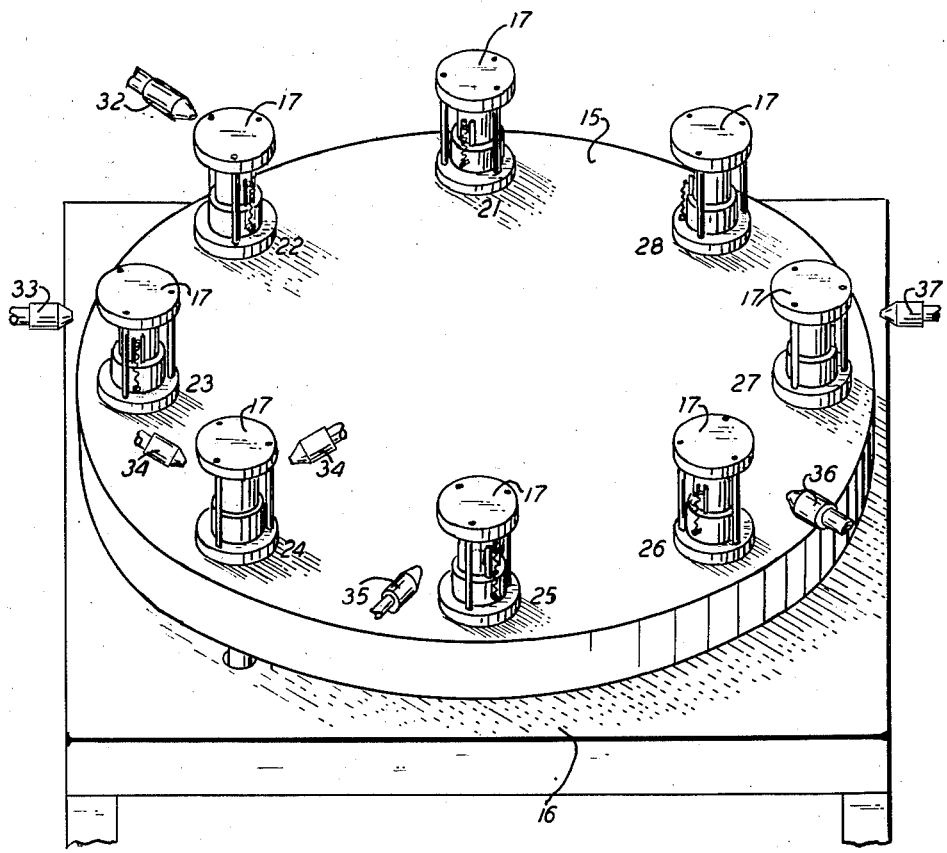
Fig. 1 is an isometric view of the apparatus.
Figure 2:
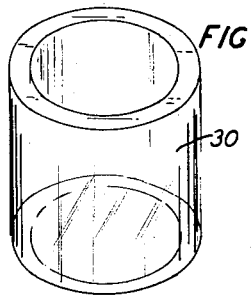
Fig. 2 is an enlarged isometric view of one of the tubular glass blanks.

Referring now to the drawings, attention is directed to Fig. 1 which illustrates the apparatus as comprising a turret 15 mounted for rotation about its axis and supported by a table 16. It is not believed necessary to show in detail the mechanism for moving the turret intermittently as this mechanism is not a part of the invention. The turret is provided with a plurality of like molding units 17, spaced equally about the turret adjacent the periphery thereof and movable successively to stations 21, 22, 23, 24, 25, 26, 27 and 28. Station 21 will be known as the loading station where tubular glass blanks 30 (shown greatly enlarged in Fig. 2) may be fed to the molding units after which they will pass to the first preheating station 22, then to the second preheating station 23, during which intervals, heat is applied to the blank by flames from burners 32 and 33. Station 24 is the molding station where heat is applied to the blank 30 from burners 34. Station 25 may be called the stripping station where the core is stripped from the molded article after heat is applied thereto by a burner 35. The next two stations 26 and 27 are termed annealing stations, the molding units being open to allow flames to be applied thereto from burners 36 and 37.

Attention is now directed to Figs. 4 to 8 inclusive, which illustrate the inner structures of the mold units and the means for actuating them. Each mold unit includes a top or fixed position mold member 40 having a lower end 41 of the contour shown particularly in Fig. 12, and a vertically extending aperture 42 for the mandrel or core pin 43. The mold member 40 is fixedly mounted in a head 44, which is supported by parallel rods 45 mounted in and extending vertically from a base 46. The base 46 is disposed concentric with a member 50 which has a tubular portion 51 extending downwardly through an aperture in the turret 15 and supported for rotation by a bearing 52. The tubular member 51 has a gear 53 mounted on the lower end thereof for engagement with a drive wheel 54. Like drive wheels are mounted at the various stations where heat is applied, to be engaged successively by the gears 53 of the mold units to cause rotation of each mold and the glass part or the article formed thereof. The wheels 54 are driven by suitable means (not shown), they, in the present instance, being operatively connected to a common drive mechanism. The upper portion of the member 50, indicated at 56, is enlarged and made hollow to receive a side mold member 57. The side mold member 57 has a tubular portion 58 integral therewith and extending downwardly through the tubular portion 51 where its lower end is provided with a flanged collar 60. The core pin 43 extends through the side mold 57 and the tubular portion thereof to a point where its lower end is provided with a flanged collar 62.

At this point, it will be noted by viewing Fig. 12 that the upper end of the core pin 43 is rounded and, below the round portion, the pin tapers a slight degree outwardly until it meets its full diameter within the lower or between mold member 65. The lower mold member 65 has a pin 66 with its inner end mounted in an aperture therein and extending outwardly through an elongate aperture 67 in the side mold member 57 to a point where the upper end of a spring 68 is connected thereto, the lower end of the spring being connected to a pin 69 fixedly mounted in an aperture of the portion 56. The contour of the upper end of the inner mold member 65 (illustrated at 70 in Fig. 12) will illustrate the formation it will give to the lower portion of the article. The pin 66, extending laterally from the inner mold 65, is positioned to ride between parallel vertically extending guide pins 71 having their lower ends mounted in the upper portion 56 of the member 50. The core pin 43 is urged downwardly by a spring 74 disposed concentric with the lower portion of the pin (Fig. 5), in a recess 76 of the tubular portion 58, the lower end of the spring resting on a collar 77 fixed to the core pin.

The flanged collars 60 and 62 for the lower mold and the core pin respectively, are to be under the control of a series of tracks (shown in Fig. 11) and mounted on the table 16 beneath the turret 15. A pair of upper tracks 78 extend counter-clockwise from position 79 to position 80 with the exception of the open portion 81 at the molding station. These tracks are shown in cross-section in Figs. 5 and 7, and it will be apparent how the grooved inner portions of the track 78 will receive the flange of the member 60 to guide it to different levels desired during the molding operation. The spaces between the positions 79 and 80 are occupied by tracks 83 having their ends disposed beneath the exit and entrance ends of the tracks 78 whereby the flanged members 60 will ride upon the upper surfaces of these tracks (as shown in Fig. 8). A single lower track 84 starting at position 85 and continuing through to position 86 adjacent the molding position 81 is located beneath and midway between the tracks 78 and 83 to cause the flanged member 62 to ride thereon as shown in Figs. 5 and 8. A pair of lower tracks 87 starting adjacent the molding position 81 and terminating adjacent the entrance end 85 of the track 84 are of the cross-sectional contours shown in Fig. 7, they being provided with grooved inner edges to receive and guide the flanged member 62.

It will be noted that the tracks (shown in Fig. 11) are supported on base plates mounted on the table 16, the base plates, indicated at 90, having threaded vertically extending rods 91, so that by the aid of suitable lock nuts the various portions of the tracks may be supported at desired levels or positions spaced from the plane of the table to accomplish positioning of the core pin and the lower mold relative to each other and the upper mold during each cycle of the apparatus.

Attention is now directed to Figs. 9 and 10 which illustrate the structure disposed at the molding station 24, the opening 81 of the tracks (shown in Fig. 11). At this station, a bearing member 100 is mounted in an aperture of the table 16 and is centrally apertured for vertical movement of a tubular member 101. The tubular member 101 has diametrically opposed elongate apertures 102 through which a pin 103 extends, the central portion of the pin being disposed in an aperture of a larger pin 104 housed in the tubular member while the ends of the pin are nested in apertures (not shown) in the bearing member 100. The tubular member 101 is connected at 105 to a piston rod 106 of an air cylinder 107, the air cylinder being mounted at a fixed position and connected through lines 108 and 109 to a supply of air under pressure by suitable control means (not shown). A connecting element 110 mounted rigidly on the upper end of the tubular member 101 is grooved laterally at 111 and provided with a supporting surface 112 and parallel recesses 113 in opposing walls thereof to receive successive sets of the flanged members 60 and 62.

Considering now the operation of the apparatus, it will be noted by viewing Fig. 4, which illustrates each molding unit 17 at station 21 (Fig. 1), that the molds at this station are open to receive the glass tubular blanks 30. Fig. 5 illustrates the molding units at stations 22 and 23 where heat is applied to the glass blank while the tracks have caused the glass blank to be exposed, it being moved out of the lower mold. At stations 22 and 23, the gear 53 of each mold unit is driven by its respective wheel 54 so that heat will be applied uniformly to the glass blank. By the time each molding unit reaches the molding station 24, the glass blank has been heated to a temperature insufficient to cause the glass to be wet and stick to the metal mold parts, but to a temperature sufficient to soften the glass so that it may be molded.

Figure 3:
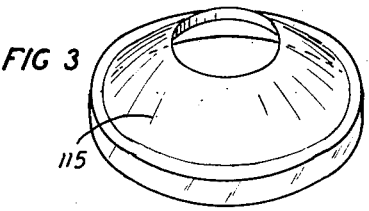
Fig. 3 is an enlarged isometric view of the molded article.

To mold the glass article at the lower temperature, it is necessary to establish a rapid molding action to overcome undesirable cooling of the glass during closing of the mold. For this reason, the quick acting air cylinder 107 forces the members of the mold into closed position with substantially no lapse of time and under a control pressure whereby the glass part may be subjected to heat, partially molded during quick closing of the mold, brought rapidly into the path of heat a second time and given its final form during a second rapid closing of the mold followed by a rapid opening of the mold during the interval of rest of the turret while each molding unit is at the molding station 24 as illustrated in Figs. 9 and 10. The final form of the molded article is illustrated at 115 in Figs. 3 and 12.

In moving from station 24 to station 25, the molded article will cool sufficiently to shrink from the inner diameter of the side mold 57 but will tend to cling to the core pin 43. At station 25, heat is applied to the molded articles, particularly at the core pin 43 to expand the inner diameter of the molded article sufficiently to permit stripping of the core pin therefrom (as shown in Fig. 7), this action being brought about through the relative positions of the tracks 87 and 78.

At stations 26 and 27, the molded article is annealed through the application of heat and during movement of the molded article from station 27 to station 28, it will have been cooled by the metal portions of the side and mold members 57 and 65, resulting in shrinkage of the material to only a small amount, but sufficiently to allow the core pin 43, when moved upwardly (as shown in Fig. 8), to act as an ejector pin to eject the molded article from the mold at station 28, holding it in this position so that it may be removed at station 21 when another tubular blank 30 is loaded into the mold.

It is to be understood that the above described arrangements are simply illustrative of the application of the invention. Numerous other arrangements may be readily devised by those skilled in the art which will embody the principles of the invention and fall within the spirit and scope thereof.

What is claimed is:

An apparatus for molding a glass article about a mandrel comprising a molding unit, a support for the unit movable intermittently about an axis to move the unit between intervals of rest at successive stations, the molding unit having a fixed position upper mold member with a longitudinal aperture therein and a surface surrounding the aperture to form a first face of the article, a movable lower mold member having an aperture therein disposed in alignment with the aperture of the upper mold member and a surface, with greater surface area than the surface of the upper mold member, surrounding the aperture thereof to form a second face of the article opposing the first face thereof, an elongate mandrel having an upper forming end portion positioned in the aperture of the lower movable mold member and adapted for close sliding fit in the apertures of both mold members, a periphery mold member having an aperture extending longitudinally therethrough for guiding longitudinal movement of the mandrel therein, the upper portion of the aperture of the periphery mold member being enlarged to receive and support the movable mold member therein and surround portions of the upper and lower mold members and the area therebetween during molding of the article, a hollow member carried by the support to hold the periphery mold member for vertical movement, elements mounted fixedly on the lower ends of the mandrel and the periphery mold member, stationary circular tracks mounted beneath the support to engage the elements to cause movement of the elements with the mandrel and respective mold members between all the stations and through all stations excepting a forming station, the tracks causing the elements to locate the lower and periphery mold members and the mandrel downwardly free of the fixed upper mold member to receive at a loading station a tubular glass part on the lower mold member concentric with the mandrel, units to preheat the glass part at subsequent stations, a unit disposed at the forming station to heat the part when the lower and periphery mold members are in their down positions, a reciprocable member to receive and hold the elements at the forming station, a unit operable by a fluid under pressure to quickly move the member through spaced reciprocating cycles to cause the elements to move the mandrel and the movable mold members toward the fixed upper mold member to preform and finally form the article around the mandrel, the tracks causing the elements to lower the mandrel and the movable mold members away from the upper mold member during movement of the molding unit away from the forming station, the article moving downwardly with the lower mold member due to the surface area of the lower mold member being greater than the surface area of the upper mold, and a unit to heat the article to cause it to expand free of the mandrel for movement of the mandrel by its element and the track, downwardly out of the article, the track being formed to cause the element on the mandrel to move the mandrel upwardly, after the article has cooled sufficiently to shrink and thereby reduce the size of the aperture therein smaller than the mandrel, to eject the article from the movable mold members.

References Cited in the file of this patent

UNITED STATES PATENTS

| | | |
|---|---|---|
| 1,453,277 | Kucera | May 1, 1923 |
| 2,195,483 | Franke | Apr. 2, 1940 |
| 2,296,347 | Hinkley et al. | Sept. 22, 1942 |
| 2,312,003 | Schneider et al. | Feb. 25, 1943 |
| 2,324,385 | Gustin et al. | July 13, 1943 |
| 2,618,904 | Gartner | Nov. 25, 1952 |

FOREIGN PATENTS

| | | |
|---|---|---|
| 530,275 | Great Britain | Dec. 9, 1940 |